United States Patent
Weisse et al.

(10) Patent No.: US 12,435,175 B2
(45) Date of Patent: Oct. 7, 2025

(54) MELAMINE-FORMALDEHYDE FOAM WITH IMPROVED WEATHER RESISTANCE

(71) Applicant: BASF SE, Ludwigshafen am Rhein (DE)

(72) Inventors: Sebastian Alexander Weisse, Ludwigshafen am Rhein (DE); Werner Lenz, Neustadt (DE); Bernhard Vath, Ludwigshafen am Rhein (DE); Tobias Heinz Steinke, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 371 days.

(21) Appl. No.: 17/769,085

(22) PCT Filed: Oct. 13, 2020

(86) PCT No.: PCT/EP2020/078673
§ 371 (c)(1),
(2) Date: Apr. 14, 2022

(87) PCT Pub. No.: WO2021/074092
PCT Pub. Date: Apr. 22, 2021

(65) Prior Publication Data
US 2024/0101745 A1    Mar. 28, 2024

(30) Foreign Application Priority Data
Oct. 17, 2019 (EP) .................... 19203868

(51) Int. Cl.
| | |
|---|---|
| C08G 12/32 | (2006.01) |
| C08G 101/00 | (2006.01) |
| C08J 9/00 | (2006.01) |
| C08J 9/14 | (2006.01) |
| C08J 9/20 | (2006.01) |
| C08L 61/28 | (2006.01) |

(52) U.S. Cl.
CPC ............ *C08G 12/32* (2013.01); *C08J 9/0023* (2013.01); *C08J 9/0028* (2013.01); *C08J 9/141* (2013.01); *C08J 9/20* (2013.01); *C08L 61/28* (2013.01); *C08G 2101/00* (2013.01); *C08G 2330/00* (2013.01); *C08G 2350/00* (2013.01); *C08J 2203/14* (2013.01); *C08J 2361/28* (2013.01); *C08L 2201/08* (2013.01)

(58) Field of Classification Search
None
See application file for complete search history.

(56) References Cited

U.S. PATENT DOCUMENTS

| | | |
|---|---|---|
| 2008/0280126 A1 | 11/2008 | Lenz et al. |
| 2010/0129303 A1 | 5/2010 | Dueva-Koganov et al. |
| 2010/0234480 A1 | 9/2010 | Hahn et al. |
| 2012/0292552 A1 | 11/2012 | Steinke et al. |
| 2015/0210814 A1 | 7/2015 | Gross et al. |

FOREIGN PATENT DOCUMENTS

| | | |
|---|---|---|
| CN | 106800667 A | 6/2017 |
| JP | 60-079062 A | 5/1985 |
| JP | 2009-531492 A | 9/2009 |
| JP | 2015-527470 A | 9/2015 |
| KR | 10-2009-0007732 A | 1/2009 |
| KR | 10-2011-0074985 A | 7/2011 |
| KR | 10-2015-0051999 A | 5/2015 |
| WO | 2018/095760 A1 | 5/2018 |
| WO | 2019/052825 A1 | 3/2019 |

OTHER PUBLICATIONS

European Search Report for EP Patent Application No. 19203868.5, Issued on Mar. 4, 2020, 3 pages.
International Preliminary Report on Patentability received for PCT Patent Application No. PCT/EP2020/078673, mailed on Sep. 14, 2021, 9 pages.
International Search Report and Written Opinion received for PCT Patent Application No. PCT/EP2020/078673, mailed on Jan. 19, 2021, 9 pages.

*Primary Examiner* — Colin W. Slifka
(74) *Attorney, Agent, or Firm* — Faegre Drinker Biddle & Reath LLP

(57) ABSTRACT

Melamine-formaldehyde foam with improved weather resistance comprising 0.1 to 8 wt.-% of at least one UV stabilizer, such as benzotriazole derivatives and piperidinol derivatives and further 1 to 3 wt.-% of at least one hydrophobicization agent, such as organo-modified siloxanes and silanes and processes for producing such melamine-formaldehyde foams with improved weather resistance.

12 Claims, No Drawings

MELAMINE-FORMALDEHYDE FOAM WITH IMPROVED WEATHER RESISTANCE

CROSS-REFERENCE TO RELATED APPLICATIONS

This application is a national stage application (under 35 U.S.C. § 371) of PCT/EP2020/078673, filed Oct. 13, 2020, which claims benefit of European Application Ser. No. 19/203,868.5, filed Oct. 17, 2019, both of which are incorporated herein by reference in their entirety.

The present invention relates to melamine-formaldehyde foams with improved weather resistance, processes for their manufacture and use in noise-insulating walls.

RELEVANT PRIOR ART

Open-cell resilient foams based on melamine-formaldehyde resins and processes for producing said foams by heating with hot air, water vapor or microwave irradiation to foam and crosslink a melamine-formaldehyde precondensate dispersion or solution comprising a blowing agent, followed by a drying and annealing step, are known and described in US 2015/0210814 for example. Melamine-formaldehyde foams of this type generally have good mechanical properties and good acoustical and thermal insulation as well as low flammability.

For some purposes further additives may be added, if desired amounts of from 0.1 to 20-% by weight, based on the melamine/formaldehyde precondensate, of customary additives, such as dyes, flame retardants, UV stabilizers or fibrous fillers, agents to reduce combustion gas toxicity or to promote carbonization.

CN 106 800 667 A discloses a colored melamine foam prepared from an aqueous melamine-formaldehyde resin, an emulsifier, a blowing agent, curing agents, colorants, light stabilizers and additives. As light stabilizer o-hydroxy benzophenone and a benzotriazole ultraviolet absorber are specifically mentioned.

WO 2018/095760 discloses a process for producing a melamine-formaldehyde foam by heating and foaming an aqueous mixture M using microwave radiation, said mixture M comprising at least one melamine-formaldehyde precondensate, at least one curative, at least one surfactant, at least one blowing agent and at least one linear polymer with a number average molecular weight Mn in the range from 500 to 10.000 g/mol and at least two functional groups selected from OH, NH2 or COOH as well as a melamine-formaldehyde foam obtainable by this process and its use.

US 2012/292552 relates to melamine-formaldehyde foams comprising hollow microspheres wherein said hollow microspheres have a median particle diameter (D50, volume averaged, Malvern, Fraunhofer diffraction) in the range from 260 μm to 490 μm, and also processes for producing these melamine-formaldehyde foams and their uses.

Open-celled melamine-formaldehyde foams can be hydrophobicized by impregnation with silicones, paraffins, silicone surfactants, fluorosurfactants, hydrophobic hydrocarbonaceous surfactants, silicone and fluorocarbon emulsions (US 2008/0280126 and WO 2019/052825) or with a compound comprising stearyl groups (US 2010/0234480) applied to the foam matrix.

Combining different additives in the foaming step may result in foams with inferior mechanical properties or even collapse of the foam. Additives applied via impregnation of the foam need to be compatible to form a homogeneous emulsion or solution for impregnation.

The present invention was made in view of the prior art described above, and the object of the present invention is to provide a melamine-formaldehyde foam with improved weather resistance and reduced water uptake while maintaining flame retardancy.

To solve the problem, the present invention provides melamine-formaldehyde foam comprising 0.2 to 8 wt.-% of at least one UV stabilizer, selected from benzotriazole derivatives and piperidinol derivatives, and 0.01 to 5 wt.-% of at least one hydrophobicization agent.

Preferably the melamine-formaldehyde foam comprises 1 to 5 wt.-% of the at least one UV stabilizer.

Suitable UV-stabilizers are organic or inorganic UV-absorbers, such as aromatic or aromatic hetercyclic compounds, preferably benzophenone, benzotriazole, oxalanilide, phenyltriazine and derivatives thereof or titanoxide, zinc oxide or iron oxide pigments. Furthermore, salts of aliphatic heterocyclic compounds, such as piperidinole derivatives or hindered amine light stabilizers (HALS), such as tetramethylpiperidine may be used as UV-stabilizers. Preferably the UV-stabilizer do not contain tributyl citrate.

The at least one UV-stabilizer preferably is selected from benzotriazole derivatives and piperidinol derivatives. Preferably the UV-stabilizer does not container further additives, such as tributyl citrate. Most preferably the melamine-formaldehyde foam comprises Benzenesulfonic acid, 3-(2H-benzotriazol-2-yl)-4-hydroxy-5-(1-methylpropyl)-, monosodium salt, commercially available as Tinogard® HS from BASF SE or (Tris(Tetramethylhydroxypiperidinol) Citrate, commercially available as Tinogard® Q from BASF SE, as UV-stabilizer.

In addition to the UV-stabilizer the melamine-formaldehyde foam comprises 0.01 to 5 wt.-% of, preferably 0.1 to 2 wt-% of at least one hydrophobicization agent.

More preferably the melamine-formaldehyde foam comprises 0.2 to 8 wt-% of the at least one UV stabilizer and 0.1 to 2 wt.-% of at least one hydrophobicization agent, most preferably 1 to 5 wt-% of the at least one UV stabilizer and 0.1 to 2 wt-% of at least one hydrophobicization agent The melamine-formaldehyde foam may comprise fluorocarbon resins or silicone resins as hydrophobicization agent. Preferably the at least one hydrophobicization agent is selected from organo-modified siloxanes and silanes.

Preferably the density of the melamine-formaldehyde foam is in the range from 8 to 12 kg/m$^3$, more preferably 9 to 11 kg/m$^3$.

Subject of the present invention is further a process for producing the melamine-formaldehyde foam with improved weather resistance described above. The melamine-formaldehyde foam may be prepared by the process described in US 2015/0210814. The UV-stabilizer may be incorporated into the melamine-formaldehyde foam by addition to the other components before foaming or by impregnation of a melamine-formaldehyde foam with a solution or emulsion comprising the UV-stabilizer. The optional hydrophobicization agent is preferably added by impregnation with a solution or emulsion comprising the hydrophobicization agent.

In a first embodiment the process for producing the melamine-formaldehyde foam comprises step a) heating and foaming an aqueous mixture M using microwave radiation, said mixture M comprising at least one melamine-formaldehyde precondensate, at least one curative, at least one surfactant, at least one blowing agent and at least one UV-stabilizer.

In the first embodiment the at least one UV-stabilizer is selected from benzotriazole derivatives. Most preferably Benzenesulfonic acid, 3-(2H-benzotriazol-2-yl)-4-hydroxy-5-(1-methylpropyl)-, monosodium salt, commercially available as Tinogard® HS from BASF SE, is used.

After preparation of the melamine-formaldehyde foam containing the UV-stabilizer in step a), the resulting foam may be impregnated in a step b) with at least one hydrophobicization agent.

In a second embodiment the process for producing the melamine-formaldehyde foam comprises step a) heating and foaming an aqueous mixture M using microwave radiation, said mixture M comprising at least one melamine-formaldehyde precondensate, at least one curative, at least one surfactant and at least one blowing agent, and step b) impregnation of the foam produced in step a) with at least one UV-stabilizer and at least on hydrophobcization agent.

In the second embodiment the at least one UV-stabilizer is preferably selected from piperidinol derivatives. Most preferably (Tris(Tetramethylhydroxypiperidinol) Citrate, commercially available as Tinogard® Q from BASF SE, is used.

In third embodiment any commercially available melamine-formaldehyde foam, such as Basotect® may be provided in step a) and impregnated in step b) with at least one UV-stabilizer and at least on hydrophobcization agent.

In all embodiments the UV-stabilizer and hydrophobicization agent used in amounts specified for the melamine-formaldehyde foam described above.

In all embodiments fluorocarbon resins or silicone resins may be used as the at least one hydrophobcization agent. Preferably the hydrophobcization agent is used in form of an emulsion in water or as a solution in a volatile organic solvent, such as methanol, ethanol, acetone or pentane. For reasons of non-flammability and occupational safety aspect preferably the at least one hydrophobicization agent is used in form of an emulsion in water.

In all embodiments the at least one hydrophobcization agent is preferably selected from organo-modified siloxanes and silanes. A solvent-free emulsion based on reactive organo-modified siloxanes and silanes, suitable as hydrophibicization agent is commercially available as Tegosivin® HE 328 from Evonik.

Step a)

The melamine/formaldehyde precondensates may be prepared separately or commercially available precondensates of the two components, melamine and formaldehyde may be used. Preferably a melamine-formaldehyde precondensate having a molar ratio of melamine to formaldehyde ranging from 5:1 to 1.3:1, more preferably from 3.5:1 to 1.5 to 1 is used. Preferably the number average molecular weight $M_n$ ranges from 200 g/mol to 1000 g/mol. Preference is given to unmodified melamine/formaldehyde precondensates.

Anionic, cationic and nonionic surfactants and also mixtures thereof can be used as dispersant/emulsifier.

Useful anionic surfactants include for example diphenylene oxide sulfonates, alkane and alkylbenzenesulfonates, alkylnaphthalenesulfonates, olefinsulfonates, alkyl ether sulfonates, fatty alcohol sulfates, ether sulfates, α-sulfo fatty acid esters, acylaminoalkanesulfonates, acyl isethionates, alkyl ether carboxylates, N-acylsarcosinates, alkyl and alkylether phosphates. Useful nonionic surfactants include alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters and alkylpolyglycosides. Useful cationic emulsifiers include for example alkyltriammonium salts, alkylbenzyldimethylammonium salts and alkylpyridinium salts.

The dispersants/emulsifiers can be added in amounts from 0.2% to 5% by weight, based on the melamine-formaldehyde precondensate.

Preferably the mixture M comprises a surfactant mixture comprising a mixture of 50 to 90 wt % of at least one anionic surfactant and 10 to 50 wt % of at least one nonionic surfactant, wherein the weight percentages are each based on the total weight of the surfactant mixture.

As curatives it is possible to use acidic compounds which catalyze the further condensation of the melamine resin. The amount of these curatives is generally in the range from 0.01% to 20% by weight and preferably in the range from 0.05% to 5% by weight, all based on the precondensate. Useful acidic compounds include organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides and mixtures thereof. Preferably formic acid is used as curative.

Depending on the choice of melamine-formaldehyde precondensate, the mixture comprises a blowing agent. The amount of blowing agent in the mixture generally depends on the desired density for the foam. Preferably the amount in relation to the melamine-formaldehyde precondensate is chosen in an amount that the density of the foam is 8 to 12 kg/m$^3$, more preferably 9 to 11 kg/m$^3$.

In principle, the process of the present invention can use both physical and chemical blowing agents.

Useful physical blowing agents include for example hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons (HCFCs), alcohols, for example methanol, ethanol, n propanol or isopropanol, ethers, ketones and esters, for example methyl formate, ethyl formate, methyl acetate or ethyl acetate, in liquid form or air, nitrogen or carbon dioxide as gases.

Useful chemical blowing agents include for example isocyanates mixed with water, releasing carbon dioxide as active blowing agent. It is further possible to use carbonates and bicarbonates mixed with acids, in which case carbon dioxide is again produced. Also suitable are azo compounds, for example azodicarbonamide.

In a preferred embodiment of the invention, the mixture further comprises at least one blowing agent. This blowing agent is present in the mixture in an amount of 0.5% to 60% by weight, preferably 1% to 40% by weight and more preferably 1.5% to 30% by weight, based on the melamine-formaldehyde precondensate. It is preferable to add a physical blowing agent having a boiling point between 0 and 80° C. Preferably pentane is used as blowing agent.

The precondensate being foamed up generally by heating the suspension of the melamine-formaldehyde precondensate to obtain a foamed material.

The introduction of energy may preferably be effected via electromagnetic radiation, for example via high-frequency radiation at 5 to 400 kW, preferably 5 to 200 kW and more preferably 9 to 120 kW per kilogram of the mixture used in a frequency range from 0.2 to 100 GHz, preferably 0.5 to 10 GHz. Magnetrons are a useful source of dielectric radiation, and one magnetron can be used or two or more magnetrons at the same time.

The foamed materials produced are finally dried, removing residual water and blowing agent from the foam.

The process described provides blocks/slabs of foamed material, which can be cut to size in any desired shapes.

In the first embodiment step a) consist preferably of the steps:
- a1) producing an aqueous mixture M comprising
  - 100 parts by weight of at least one melamine-formaldehyde precondensate,
  - 2 to 4 parts by weight, preferably 2.2 to 3.8 parts by weight and more preferably 2.7 to 3.3 parts of at least one curative,
  - 0.2 to 5 parts by weight, preferably 0.5 to 3 parts by weight and more preferably 1.25 to 2.3 parts by weight of a surfactant mixture,
  - 0.1 to 5 parts by weight, preferably 0.5 to 4 parts by weight and more preferably 1.1 to 3.6 parts by weight of at least one salt of an inorganic acid and/or of an organic carboxylic acid,
  - 1 to 40 parts by weight, preferably 10 to 35 parts by weight and more preferably 15 to 21 parts of at least one blowing agent,
  - 0.2 to 8 parts by weight, preferably 1 to 5 parts of at least one UV-stabilizer.
  - 25 to 60 parts by weight, preferably 30 to 50 parts by weight and more preferably 36 to 44 parts of water,
- a2) heating and foaming said mixture M using microwave radiation,
- a3) annealing the foam using hot air and/or nitrogen in a temperature range from 150° C. to 290° C., Step b)

Impregnation of the foam may be carried out by any suitable method, i.e. as described in WO 2019/052825 or US 2008/0280126.

In the first to third embodiment step b) consist preferably of the steps:
- b1) mixing the at least one hydrophobicization agent, optionally the at least one UV-stabilizer, further additives and water,
- b2) applying the mixture of step (b1) to the melamine-formaldehyde foam,
- b3) optionally post-pressing of the foam, in order to introduce the mixture into the pores of the foam, and
- b4) drying of the foam.

The mixture to the foam in step b2) may be applied to the foam by soaking of the foam with the mixture or by needle injection.

By a post-pressing of the foam with the mixture in step b3), the mixture may be introduced into the pores of the foam with a uniform distribution. For this purpose, the foam may be passed between two rollers rotating in the opposite direction, wherein the distance of the rollers is selected such, that the foam is pressed together. The applied impregnation mixture is applied to the horizontal rollers placed side-by-side, so that at the site, the foam is moved through the rollers to, a liquid pool is formed. By the rotational motion of the rollers and the pressing of the foam the mixture is pressed from the liquid pool into the foam. The mixture is laid around the webs of the foam and thus forms a closed surface after curing.

In step b4) drying is carried out preferably in a drying oven at a temperature in the range of 40 to 200° C., particularly preferably 100 to 150° C. until a constant weight.

The present invention is further directed to a melamine-formaldehyde foam obtainable by processes according to the invention.

The melamine-formaldehyde foam according to the invention may be used for acoustical and/or thermal insulation in aircraft, ship, railway and motor vehicle construction, in mechanical engineering or in building construction, especially for insulation of internal and external walls, roofs, facades, doors and flooring. A preferred use of the melamine-formaldehyde foam are applications in noise-insulating walls along roads, highways and railroad tracks.

EXAMPLES

Hereinafter, the present invention is described in more detail and specifically with reference to the Examples, which however are not intended to limit the present invention.

Methods of Measurement:

Ram Pressure Value [N]:

All the ram pressure value measurements for assessing the mechanical/resilient properties of the melamine-formaldehyde foams were carried out as follows: A cylindrical steel ram 8 mm in diameter 10 cm in height was pressed at a right angle into a cylindrical foam sample 11 cm in diameter and 5 cm in height until the foam sample broke. The maximum force (unit: N) exerted by the ram until the foam sample broke is hereinafter also referred to as ram pressure value and provides information about the mechanical/resilient quality of the foam. The greater the ram pressure values are, the better the mechanical/resilient properties of the melamine-formaldehyde foams are.

Water Absorption:

The hydrophobicity was determined as the water absorption $W_p$ during a short-term partial immersion according to DIN EN 1609. The test specimen (150×150×25 mm) is then placed into an empty water container and loaded in such a way, that it remains partially submerged during the addition of water. Then water is carefully added into the container, until the underside of the test specimen is 10 mm below the water level. After 24 h the specimen is taken out. After a dripping time of 10 min is weighed again and the mass $m_{24}$ of the test specimen determined. The absorption of water in kilograms per square meter is calculated from the difference between $m_{24}$ and $m_0$ divided by the lower boundary surface of the test specimen $A_p$ in square meters. According to DIN EN 13162 the test result shall not exceed a water absorption of 1.0 kg/m².

Weather Resistance

Test samples of the foams were subjected to irradiation and humidity in the Heraeus×450 irradiation apparatus according to ISO 4892-2, method A. For determination of the weather resistance samples were taken out at 1000 h, 2000 h und 3000 h. Subsequently elongation at break was determined according to ISO 1798. Weather resistance was determined as good, when elongation at break was not reduced after irradiation compared with the sample before irradiation.

Burning Test

Burning test was carried out according to EN ISO 11925-2 (2010). The results were preliminary classified following DIN EN 13501-1 (2010). The melamine-formaldehyde foam preferably has a flame height of ≤150 mm in the burning test according to EN ISO 11925-2 (2010).

Materials Used:

MF Melamine-formaldehyde precondensate having an average molecular weight (number average) M of 350 g/mol, with a molar ratio of melamine:formaldehyde of 1:3, which apart from melamine comprised no further thermoset-formers and apart from formaldehyde comprised no further aldehydes and which was sulfite group free.

T1 $C_{12}/C_{14}$-alkyl sulfate, sodium salt.

T2 alkyl polyethylene glycol ether made from a linear, saturated $C_{16}/C_{18}$ fatty alcohol.

UV1 Tinogard® HS (Benzenesulfonic acid, 3-(2H-benzotriazol-2-yl)-4-hydroxy-5-(1-methylpropyl)-, monosodium salt, from BASF SE).

UV2 Tinogard® Q (Tris(Tetramethylhydroxypiperidinol) Citrate, from BASF SE

UV3 Cibafast H (Sodium 3-(2H-benzotriazol-2-yl)-5-sec-butyl-4-hydroxybenzenesulfonate and Tributyl citrate).

HA Tegosivin® HE 328 (solvent-free emusion based on reactive organo-modified siloxnes and silanes)

Comparative Example C3

In a first step, 100 parts by weight of the melamine-formaldehyde precondensate, MF, 38 parts by weight of water, 1.2 parts by weight of anionic surfactant T1, 0.3 parts by weight of non-ionic surfactant T2, 2.5 parts of sodium formate, 3.0 parts of formic acid, 2.5 parts by weight of UV-stabilizer UV 1 (Tingogard® HS) and 18 parts by weight of the pentane were mixed with one another at a temperature of 20 to 35° C. The mixture was introduced into a foaming mold of polypropylene and irradiated in a microwave oven with microwave. The foam bodies obtained after microwave irradiation were annealed in a circulating air oven at 200° C. for 20 min. Ram pressure value was 30 N.

Comparative Example C1

Comparative Example 3 was repeated without addition of UV-stabilizer UV1. Ram pressure value was 29 N Comparative Example C2

Comparative Example C3 was repeated with addition of 2.5 parts by weight of UV-stabilizer UV2 instead of UV1. Ram pressure value was 22 N.

As can be seen from the ramp pressure value, the UV-stabilizer UV1 can be incorporated into the foam matrix by added UV1 to the mixture before foaming without deteriorating the mechanical properties of the melamine-formaldehyde foam.

Example 2

A sheet-like blank with a thickness of 50 mm of the melamine-formaldehyde foam from Comparative Example, C3 was immersed in a dispersion consisting of 5 parts by weight of water repellant Tegosivin® HE 328, and 995 parts per weight of water. The impregnated sheet was subsequently passed through a gap between two counter-rotating rollers (Foulard, Mathis HVF 5) and from there to subsequent drying at 130° C. until a constant weight was obtained. The results are shown in the following table 1.

Example 3

A sheet-like blank with a thickness of 50 mm of the melamine-formaldehyde foam from Comparative Example 1 was immersed in a dispersion consisting of 5 parts by weight of water repellant Tegosivin® HE 328, 25 parts by weight of UV-stabilizer UV2 (Tinogard® Q) and 970 parts per weight of water. The impregnated sheet was subsequently passed through a gap between two counter-rotating rollers (Foulard, Mathis HVF 5) and from there to subsequent drying at 130° C. until a constant weight was obtained. The results are shown in the following table 1.

Comparative Example C4

A sheet-like blank with a thickness of 50 mm of the melamine-formaldehyde foam from Comparative Example 1 was immersed in a dispersion consisting of 5 parts by weight of water repellant Tegosivin® HE 328, and 995 parts per weight of water. The impregnated sheet was subsequently passed through a gap between two counter-rotating rollers (Foulard, Mathis HVF 5) and from there to subsequent drying at 130° C. until a constant weight was obtained. The results are shown in the following table 1.

Comparative Example C5

A sheet-like blank with a thickness of 50 mm of the melamine-formaldehyde foam from Comparative Example 1 was immersed in a dispersion consisting of 5 parts by weight of water repellant Tegosivin® HE 328, 25 parts by weight of UV-stabilizer UV3 (Cibafast® H) and 970 parts per weight of water. The impregnated sheet was subsequently passed through a gap between two counter-rotating rollers (Foulard, Mathis HVF 5) and from there to subsequent drying at 130° C. until a constant weight was obtained. The results are shown in the following table 1.

TABLE 1

Addition of UV-Stabilizer and Hydrophobicization agent (HA) and test results for Examples 2 and 3 and Comparative Examples CE1-CE5

| Example | C3 | C1 | C2 | 2 | C4 | 3 | C5 |
|---|---|---|---|---|---|---|---|
| Step a) | UV1 |  | UV2 | UV1 |  |  |  |
| Step b) |  |  |  | HA | HA | HA | HA |
|  |  |  |  |  |  | UV2 | UV3 |
| Ram pressure Value | 30 | 29 | 22 | 26 |  | 30 | 28 |
| Density [kg/m$^3$] | 8.5 | 8.2 | 8.8 | 8.3 | 8.7 | 7.5 | 10.1 |
| Water absorption [kg/m$^2$] | 17.7 | 20.6 | 19.6 | 0.24 | 0.28 | 0.1 | 6.74 |
| Weather resistance | good | bad | good | good | bad | good |  |
| Burning test |  |  |  | Class B | Class B | Class B |  |

The invention claimed is:

1. Melamine-formaldehyde foam comprising 0.2 to 8 wt. % of at least one UV stabilizer, selected from piperidinol derivatives, and 0.01 to 5 wt. % of at least one hydrophobicization agent.

2. Melamine-formaldehyde foam according to claim 1, wherein the at least one hydrophobicization agent is selected from organo-modified siloxanes and silanes.

3. Melamine-formaldehyde foam according to claim 1, wherein the at least one UV stabilizer is tris(tetramethylhydroxypiperidinol) Citrate.

4. A foam for acoustical or thermal insulation in aircraft, ship, railway and motor vehicle construction, in mechanical engineering or in building construction, comprising the melamine-formaldehyde foam according to claim 1.

5. A foam for noise-insulating walls along roads, highways and railroad tracks, comprising the melamine-formaldehyde foam according to claim 1.

6. A process for producing a melamine-formaldehyde foam according to claim 1, comprising step a) providing a melamine-formaldehyde foam and step b) impregnation of the foam provided in step a) with at least one UV-stabilizer, selected from piperidinol derivatives, and at least one hydrophobcization agent.

7. A process for producing a melamine-formaldehyde foam comprising
   step a) heating and foaming an aqueous mixture M using microwave radiation, said mixture M comprising at least one melamine-formaldehyde precondensate, at least one curative, at least one surfactant and at least one blowing agent, and
   step b) impregnation of the foam produced in step a) with at least one UV-stabilizer, selected from piperidinol derivatives, and at least one hydrophobicization agent.

8. The process according to claim 7, wherein the at least one UV-stabilizer is tris(tetramethylhydroxypiperidinol) citrate.

9. The process according to claim 7, wherein the at least one hydrophobicization agent is selected from organo-modified siloxanes and silanes.

10. The process according to claim 7, wherein said mixture M comprises a surfactant mixture comprising a mixture of 50 to 90 wt. % of at least one anionic surfactant and 10 to 50 wt. % of at least one nonionic surfactant, wherein the weight percentages are each based on the total weight of the surfactant mixture.

11. The process according to claim 7, wherein formic acid is used as curative.

12. The process according to claim 7, wherein pentane is used as blowing agent.

* * * * *